United States Patent [19]

Watts et al.

[11] 3,892,575

[45] July 1, 1975

[54] METHOD OF MODIFYING THE SURFACE PROPERTIES OF A SUBSTRATE

[75] Inventors: Ronald E. Watts; Louis A. Errede, both of Harlow, England

[73] Assignee: Minnesota Mining and Manufacturing Company, St. Paul, Minn.

[22] Filed: Dec. 7, 1972

[21] Appl. No.: 312,954

[30] Foreign Application Priority Data

Dec. 13, 1971 United Kingdom............. 057849/71

[52] U.S. Cl.................................. 96/84 R; 427/54
[51] Int. Cl............................................. B44d 1/50
[58] Field of Search.......... 117/93.31, 118, 138.8 E, 117/138.8 F, 138.8 N, 34, 164

[56] References Cited
UNITED STATES PATENTS

| | | | |
|---|---|---|---|
| 3,101,275 | 8/1963 | Cairns et al..................... | 117/93.31 |
| 3,188,165 | 6/1965 | Magat et al...................... | 117/93.31 |
| 3,188,228 | 6/1965 | Masat et al. ..................... | 117/93.31 |
| 3,475,193 | 10/1969 | Takenaka et al. .................... | 117/34 |
| 3,705,808 | 12/1972 | Kasugai et al. ..................... | 117/34 |
| 3,745,042 | 7/1973 | Lim et al. ......................... | 117/93.31 |

*Primary Examiner*—Ralph Husack
*Assistant Examiner*—John H. Newsome
*Attorney, Agent, or Firm*—Alexander, Sell, Steldt & DeLaHunt

[57] ABSTRACT

This invention provided a way of modifying the surface properties of substrates such as films of plastics material. The substrate is given a very thin coating of a mixture of modifying materials and the latter is then bonded to the substrate by irradiation with ultra-violet light. A modifying material which gives the desired surface properties is present as an emulsion in a solution of a second modifier which is readily bondable to the substrate by ultraviolet light. Although the resulting bonded modifying material is so thin as to lead to negligible increase in weight, the surface properties of the substrate become those of the modifying material while its bulk properties remain the same. The invention is particularly useful for imparting hydrophilic surfaces to films of plastics material.

6 Claims, No Drawings

METHOD OF MODIFYING THE SURFACE PROPERTIES OF A SUBSTRATE

This invention relates to the provision of very thin coatings on objects such as polymeric films, fibres or other shaped articles so as to modify the surface properties of those objects.

Polymeric films have many useful properties such as toughness and flexibility. However, general application of these films can often be limited by their less desirable surface properties. For example, they often have hydrophobic surfaces and so they are not suitable as receptors for water-soluble inks and other materials such as gelatin. Therefore in the application of these films it is usually necessary to modify their surface properties.

Synthetic plastics films such as polyethylene films can be bonded to other preformed synthetic films such as polyethylene terephthalate film by irradiating an interface between the two films with ultra-violet light. In this process an ultra-violet absorbent film is required for the film furthest from the ultra-violet light and an ultra-violet transparent film is required for the film nearest to the ultra-violet light. Also the molecules of the transparent film must be capable of reacting with the photo-excited molecules of the ultra-violet absorbent film. These requirements naturally limit the range of films which can be bonded in this way.

The invention aims at extending the range of coatings and substrates which can be bonded together.

According to the invention there is provided a process for modifying the surface properties of a substrate in which the substrate is coated with a solution or dispersion of a modifying material to be bonded to the substrate to modify the surface properties of the substrate and the coated surface of the substrate is irradiated with ultra-violet light for a time sufficient to give effective bonding of the modifying material to the substrate without substantial degradation of the molecules of the modifying material or of the substrate, the coating of the modifying material having a final adhered thickness of no more than $0.1\ \mu$ and being sufficiently thin as to give the substrate a negligible increase in weight.

The invention also extends to the substrate whose surface properties have been modified in this way by effectively bonding to the substrate a coating of a modifying material which modifies the inherent surface properties of the substrates and is of thickness no greater than $0.1\ \mu$ and sufficiently thin to impart negligible increase in weight in the substrate.

By adopting the invention one can inter alia effectively bond together two materials neither of which is transparent to ultra-violet light in bulk because the coating will be sufficiently thin for the exciting ultra-violet light to reach the region of the interface between the coating and the substrate. Thus, the coating will be only a few molecules thick and so the ultra-violet light can readily excite the molecules near the interface between the coating and the substrate.

Also substrates are provided whose surface properties have been modified without substantially altering their bulk properties, e.g. thickness, and without imposing on the substrates the bulk properties of the coating, because the thin layer will be so thin, e.g. of molecular thickness, as to be almost invisible and not alter properties such as strength, toughness, flexibility, water permeability and so on of the substrate.

Where the modifying material does not absorb ultra-violet light it is preferred that the substrate be of a material which does absorb ultra-violet light so as to concentrate the excitation at or near the interface between the coating and substrate.

The irradiation with ultra-violet light can have one or more of a number of effects depending upon the nature of the substrate and of the modifying material and effective bonding will occur when the molecules of the coating cannot be removed from the substrate by, say washing with a solvent for these molecules.

Where the molecules of the modifying material or of the substrate or of both are of a type which can be activated by the ultra-violet light to become, for example, free radicals, and the molecules of the substrate or modifying material or both, respectively, will react with those activated molecules, a chemical reaction can occur between the molecules of the modifying material and substrate with the result that the coating and substrate become chemically bonded to each other.

In certain other cases, the modifying molecules may readily form a loose bond with the substrate, i.e. be physically adsorbed because of Van der Waals forces, but this bond will be easily broken between the individual modifying molecules and the substrate, e.g. washing with water or other chemical solution may remove these chemically adsorbed molecules. Where the adsorbed modifying molecules can react with one another upon irradiation with ultra-violet light, the irradiation will cause the modifying molecules to link together with one another into chains or groups and in this way the coating as a whole is fixed very securely to the substrate because it is necessary to remove a larger number of individual molecules from the surface to remove the coating. In this case it is, of course important to ensure that the coating is so thin that the modifying molecules which link together are those which have become adsorbed onto the substrate.

Therefore, according to another aspect of the invention, there is provided a process for modifying the surface properties of a substrate in which a solution or dispersion of the material to be coated is coated onto the substrate in such a thickness that the final thickness of the adhered coating will be no more than $0.1\ \mu$ and will give a negligible increase in weight to the substrate, the molecules of the material to be coated being capable of being adsorbed onto the substrate and being capable of reaction with one another to form addition products upon irradiation with ultra-violet light, and the coated substrate is irradiated with ultra-violet light for a time sufficient to provide linking between molecules of the modifying material adsorbed onto the substrate without substantial degradation of the molecules of the coating or of the substrate, so giving an effective bond between the modifying material and the substrate.

In other cases one can obtain a combination of these two effects, the irradiation causing bonding between the modifying molecules and the substrate and between individual modifying molecules. In practice it is preferred that the modifying material be chosen so that at least some of the molecules of modifying material bond to one another during irradiation e.g. the modifying material can include one or more compounds or functional groups which are polymerizable upon ultra-violet light irradiation.

As will be appreciated, the process of the invention provides ways of bonding a wide variety of extremely thin coatings very firmly onto a wide variety of substrates.

It is desirable that the solution or dispersion of the coating material be spread substantially uniformly over the surface of the substrate. This can be facilitated by adding to the solution or dispersion a surfactant to lower the surface energy between the solution or dispersion and the substrate.

We also find that an improvement in the uniformity of spreading the modifying material on the substrate can be made by using as the coating a heterogeneous mixture containing at least two compatible components. Thus, for example, the coating can be a dispersion or emulsion of one component, e.g. a polymeric latex, in a solution of another component. For reasons of which we are not certain the use of such a coating appears to improve the uniformity of the coating over the surface of the substrate and this may be because particles of the dispersion or emulsion settle from the dispersion onto the surface of the substrate fairly uniformly from the coating and then, as the solvent for the other component evaporates the other component becomes concentrated on the surface between and possibly over the particles of the dispersion or emulsion. This view appears to be supported by the fact that an improvement in the adhesion between the substrate and coating can be achieved if the dispersion component is chosen so as to be readily bondable upon irradiation with ultra-violet light to the substrate while the solute component is chosen so as to be readily bondable to the dispersion component upon irradiation with ultra-violet light and also to provide the surface properties which it is intended to impart to the substrate. This does not exclude of course the possibility of at least some of the solute component molecules becoming bonded to the substrate upon ultra-violet light irradiation. Further this procedure provides a convenient way of subbing a substrate with, in effect, two layers in a single operation. Thus, prior to the invention it would have been necessary to bond chemically a layer of the emulsion to the substrate as a first step and then to bond chemically a layer of the solute to the layer of emulsion as a second step.

Because the coating is applied as a solution or dispersion, the coating will be thin and this is important to allow the ultra-violet radiation to reach the molecules in the region of the interface in order to excite them. The coating must be sufficiently thin to give a negligible increase in weight to the coated substrate. For example, the weight increase after the application of the coating should be no more than 0.1 percent by weight and preferably much less. In general we find that such coatings are not more than a few molecules thick, e.g. from $0.01 \mu$ to $0.10 \mu$ in thickness. When the bound coating is examined through a microscope e.g. magnified 1300 times, the coating will often be so thin as to appear discontinuous, i.e. a large number of small islands of modifying material stuck to the substrate. In fact if the coating is stained and then observed through a microscope, the coated surface resembles a severe irregular rash. We find, however, that this apparently discontinuous coating is sufficient to modify the surface properties of the substrate to those of the coating.

The solvent or suspending medium, e.g. the water, need not be removed, either partially or completely, before the ultra-violet irradiation, but after irradiation, it, or any traces of it, can be evaporated off leaving the coating bound to the substrate. The solvent or suspending medium is therefore preferably a material which will evaporate reasonably readily.

The molecules which absorb ultra-violet radiation become excited independently of temperature and once excited they then react with other molecules about them in a three-dimensional manner at a rate dependent upon the temperature. When this excitation occurs at the interface between the coating and the substrate bonding occurs across the interface between the coating and the substrate. In other cases crosslinking occurs within the coating itself. Since these chemical reactions occur faster at higher temperatures, it is therefore preferable to use elevated temperatures, e.g. from 60° to 180°C. For each particular pair of coating and substrate there is an optimum temperature which can be found easily by simple experiment.

According to one embodiment of the invention, the substrate, e.g. a polymeric film, is uniformly coated with a thin film of a dilute solution of the required organic modifying material in water or an organic solvent. The wet film is then warmed to about 100°C and irradiated with ultra-violet light, e.g. of wavelength 2537A, for 20 to 120 seconds to bond the organic modifying molecules onto the surface of the polymeric film. The film can then be washed if desired with solvent to remove any unbonded modifying material. Despite the fact that the coating will have the thickness of only a few molecules at the most, the surface properties of the exposed area are those imparted by the bound organic modifying species. Because the coating is sufficiently thin, the requirement that the material of the coating be transparent to ultra-violet light is eliminated. Also the excited species and the reactant can now come from either side of the interface. This invention is thus applicable to a much wider range of substances than can be bonded by prior processes.

Preferred substrates include for example polyesters such as poly(ethylene terephthalate), and poly(hexahydroxylene terephthalate), polyamides such as Nylon 6, Nylon 66 and Nylon 10, polyimides such as the condensation polymer of pyromellitic acid and bisphenylamine ether known as Kapton, polymeric olefins such as polyvinyl chloride, polyethylene, polyacrylates, polystyrene and their copolymers, poly carbonates, modified celluloses such as cellulose triacetate and metals such as aluminium, copper and steel.

Examples of modifying materials suitable for the thin coating layer include poly(ethylene oxide), poly(propylene oxide), sulphonated polystyrene, sulphonated poly(vinyl toluene), p-(n-dodecyl) benzene sulphonic acid, n-dodecyl dimethylamine, gelatin, modified celluloses such as cellulose acetate, poly(vinyl pyrrolidone), poly(vinyl pyridine), maleic anhydride copolymers such as that known as Gantrez, poly-$\beta$-perfluoroctyl sulphonamide, ethyl acrylate and its copolymers, polyacrylic acid, its copolymers and derivatives such as esters and amides, polyvinyl alcohol, partially hydrolysed poly(vinyl acetate), polyethyleneimines, block polymers and copolymers of hydrocarbon and/or fluorocarbon monomers, water soluble urea formaldehyde condensates, or silicone polymers, compatible mixtures of two or more of any of these aforementioned polymers and mixtures of one or more of any of these aforementioned polymers with an ultra-violet polymerizable monomer such as N,N'-methylene-diacryl amide or a co-reactant which will react upon irradiation with ultra-violet light.

Examples of suitable combinations of substrates and modifying materials are a poly(ethylene terephthalate), nylon, polyimide, polycarbonate or cellulose triacetate substrate coated with a sulphonated polystyrene, sulphonated poly(vinyl toluene), polyacrylic acid or one of its copolymers or derivatives such as an ester or amide, maleic anhydride copolymer, poly(vinyl alcohol), partially hydrolysed poly(vinyl acetate), poly(ethylene oxide), poly(vinyl pyrrolidone), poly(vinyl pyridine) a modified cellulose, gelatin, polyethyleneimine, block polymers and copolymers of hydrocarbon and fluorocarbon monomers, water soluble urea formaldehyde condensates or silicone monomers, compatible mixtures of two or more of the aforementioned polymers and mixtures of one or more of these polymers with an ultra-violet polymerizable monomer such as N,N'-methylenediacrylamide or a co-reactant which will react upon irradiation with ultra-violet light, or a polyethylene or polyvinyl chloride substrate coated with one or more of the above listed coating materials, at least one of which contains ultra-violet light excitable groups or together with an ultra-violet light polymerizable monomer.

In the case where the coating material consists of a heterogenous mixture of compatible components, suitable mixtures include a polymer latex such as an aqueous latex of poly(ethyl acrylate) and an aqueous solution of sulphonated poly(vinyl toluene) and for example N,N'-methylenediacrylamide.

The ultra-violet light with which the coated substrates are coated can conveniently have a wavelength which will pass through air, e.g. from about 185 to 400 nm. Preferably the intensity of the radiation in the ultra-violet region is many times greater than the ultra-violet content of the noonday sun. By properly controlling the light intensity and the duration of the irradiation, an effective bond can be realised without substantial degradation either of the coating or substrate. A number of artifical sources of radiation are available for use in the process of the invention.

The substrate to be irradiated is conveniently passed on a moving belt or as a self-sustaining web horizontally through a box fitted with the high intensity ultra-violet lamp source, and either the rate of movement, the number of passes, or the number of lamps may be adjusted according to the requirements of the particular substrate to give the degree of ultra-violet light exposure required to give effective bonding without substantial degradation of either the substrate or coating.

The invention has important utility in providing subbed photographic film bases. Thus, prior to the invention the usual way of ensuring adhesion between say a polyester film base and the gelatin photographic layers was to apply to the film base two and mostly more subbing layers, the first of which bonds reasonably well to the polyester film base while the last of which bonds reasonably well to the gelatin layers. The application of these numerous layers is time consuming and costly and film bases subbed in this way do not always give entirely satisfactory bonding between the base and gelatin photographic layers.

According to the present invention, photographic film bases, e.g. polyester films, can be subbed with a single layer of sulphonated polystyrene and/or gelatin to render the surface of the film base hydrophilic so as to be readily receptive to and well bonded to gelatin or other aqueous colloid layers. Thus, according to the invention a polyester film base can be subbed by coating it with a solution of sulphonated polystyrene and/or gelatin molecules bonded to the polyester film base by irradiation with ultra-violet light. To the resulting hydrophilic surfaced film base gelatin or other aqueous colloid layers can be readily adhered.

One use to which substrates which have been given a hydrophilic surface according to the present invention can be put, is in antimisting substrates as described in our copending U.S. application Ser. No. 303,416, filed Nov. 3, 1972 now abandoned.

The invention has many other useful applications, however, including the preparation of antistatic films, mordant photographic film bases for cationic antihalation dyes and water soluble ink receptive sheets. Also by image-wise irradiation of a substrate carrying the thin layer of material e.g. through a stencil, one can prepare full and half-tone plates and printing plates. Further one can readily make fibres e.g. polyester fibres, dye receptive by treating them according to the invention with a coating to which dye can chemically be readily fixed. Also the substrate to be coated can be a three-dimensional object such as a moulded synthetic plastics material object.

The invention will now be illustrated by the following Examples. In all of these Examples the coating weight of the modifying material was in the range of 0.1 to 0.01 g/m$^2$ and so gave negligible increase in weight to the substrate.

EXAMPLE 1

A film of polyethylene terephthalate (6 mil. in thickness) was coated with a thin film of a 1 percent aqueous solution of sulphonated polystyrene. The wet film was warmed to about 100°C and half was irradiated with ultra violet light of 253.7 nm for about one minute. The irradiated film was washed vigorously with hot water to remove unbonded sulphonated polystyrene. The irradiated region of the film was completely hydrophilic whereas the non-irradiated portion was completely hydrophobic. The film was dried at room temperature.

a. A sample of this film was compared with unmodified poly(ethylene terephthalate) film for antistatic tendency at 50 percent relative humidity. The unmodified film was easily charged by static friction whereas the modified film was not. This demonstrates utility as antistatic films for which there is a ready application for tapes, sheets and other articles.

b. Another sample of this film which was surface modified on only half its area, was exposed to steam vapour to permit surface condensation. Tiny droplets appeared ubiquitously on the unmodified portion to form a clouded, non-transparent film, whereas the modified portion remained free of droplets to maintain a clear transparent film. This demonstrates utility as antimisting films and uses include laminates for automobile windows and laminates in frozen food packaging.

c. Another sample of this film was dipped into a dilute aqueous solution of methyl violet, a quaternary ammonium blue dye. The film was washed vigorously with water to remove excess dye solution. The surface modified side was stained a deep blue to about 2.3 optical density, whereas the unmodified surface was completely clear. The thickness of the stained surface modified layer, was measured optically to be less than 0.1 $\mu$.

The dye was absorbed molecularly to give outstanding colour quality and optical absorption, per unit weight. These results demonstrate utility as surface tinted film base for X-ray films. Conventional X-ray film base is tinted by incorporating pigment in the film proper which makes problems in extrusion and fabrication. The present method is easier and more effective. Although these films could be stained heavily with cationic dyes, they could not be stained permanently by an anionic dye.

When the film was stained by an alkali or bisulphite sensitive dye it was decolourised rapidly when placed in a photographic developer solution. These results demonstrate utility as a mordant film base for cationic antihalation dyes. Overcoating with a suitable photographic emulsion afforded an effective microfilm product.

d. Another sample of this film was pressed against a printing plate coated with a quaternary ammonium dye such as methyl violet. The impression of the plate was cleanly visible, thus demonstrating utility as water soluble ink receptive polyester film. Another example of this capability was the ease with which one could write on this surface with water soluble ink or brush with water soluble paint.

EXAMPLE 2

A film of poly(ethylene terephthalate) 6 mil thick was coated with a thin film of a 1 percent aqueous solution of sulphonated polystyrene. The film was dried at 100°C. Samples of this film were irradiated for one minute with ultra-violet light of 253.7 nm wavelength through a stencil, while the composition was kept at 100°C. The sample was washed with water to remove unbonded sulphonate polymer. The film was completely clear and apparently unmodified except that the stencil was replicated as a hydrophilic image on an oleophilic background.

2. One sample, made as above, was dipped into a dilute solution of a quaternary ammonium dye, methyl violet, and the film washed in clear water. The image was sharply delineated by the retention of a uniform deep blue stain in the image area. This result demonstrated application of the invention as an imaging system. Another image was made by irradiating through a screen and stencil to give a halftone reproduction of the first image. The dot pattern was extremely sharp, showing application of the invention to half-tone imaging systems for newspaper reproduction.

b. Another sample, made as above, was treated with an oleophilic ink by means of a roller. The film was then pressed against a white sheet of paper and was found to transfer cleanly the oleophilic background area leaving the hydrophilic image area paper white. This demonstrates utility of the invention in the preparation of a printing plate.

EXAMPLE 3

An aqueous solution containing 1.5 percent sulphonated poly(vinyl toluene), 1.5 percent N,N-methylenediacrylamide and a small amount of a surfactant such as saponin to ensure uniform wetting was coated in a thin film onto a sheet of poly(ethylene terephthalate). The wet film was heated to about 100°C and irradiated with ultra-violet light of wavelength 253.7 nm for about 15 seconds. After irradiation the material showed all the properties described for the material prepared as described in Examples 1 and 2 with the added advantage of improved abrasion resistance.

EXAMPLE 4

A maleic anhydride vinyl ether commercial copolymer was dissolved in water to give a 1 percent solution. This, with the addition of a small amount of saponin, was coated onto a sheet of poly(ethylene terephthalate). After drying the sheet was heated to about 100°C and irradiated with a germicidal ultra-violet lamp for 1 minute. The resulting hydrophilic coating could be dyed, resisted moderate abrasion and could not be removed from the substrate by adhesive tape.

EXAMPLE 5

A 1 percent aqueous solution of a commercial poly(vinyl alcohol) with added saponin was applied as a thin coating to a sheet of poly(ethylene terephthalate). After drying the sheet was heated to about 100°C and irradiated with a germicidal ultra-violet lamp for 1 minute. The resulting hydrophilic coating resisted moderate abrasion and could not be removed by adhesive tape.

EXAMPLE 6

A 1 percent aqueous solution of poly(ethylene oxide) of average molecular weight about 6000 with added saponin was applied as a thin coating to a sheet of poly(ethylene terephthalate). After drying the sheet was heated to about 100°C and irradiated with a germicidal ultra-violet lamp for 1 minute. The resulting hydrophilic coating resisted moderate abrasion and could not be removed by adhesive tape.

EXAMPLE 7

A 1 percent solution of poly(vinyl pyrrolidone) with added saponin was coated in a thin layer on a sheet of poly(ethylene terephthalate). The wet sheet was heated to about 100°C and irradiated for 1 minute with a germicidal ultra-violet lamp. The resulting hydrophilic coating resisted moderate abrasion and could not be removed by adhesive tape.

EXAMPLE 8

An aqueous solution was prepared containing 0.25 percent polyacrylamide and 0.5 percent sulphonated poly(vinyl toluene) together with a small amount of a surfactant. This was applied as a thin film to a sheet of poly(ethylene terephthalate) and, after drying the sheet was heated to about 100° and irradiated with a germicidal ultra-violet lamp for 1 minute. The resulting hydrophilic surface could be dyed with basic dyes and showed better abrasion resistance than the sulphonated poly(vinyl toluene) film used above.

EXAMPLE 9

A 1 percent solution of poly(4-vinyl pyridine) in dilute acetic acid solution was prepared of pH5. This solution with added surfactant, was applied as a thin film to a sheet of poly(ethylene terephthalate) and after drying the sheet was heated to 120°C and irradiated with a germicidal ultra-violet lamp for two minutes. The resulting hydrophilic surface could be dyed with acid dyes, showed good abrasion resistance and could not be removed from the substrate by adhesive tape.

EXAMPLE 10

A 1 percent aqueous solution carboxymethylcellulose with a small amount of added saponin was coated in a thin film on a sheet of poly(ethylene terephthalate). After drying the sheet was heated to 110°C and irradiated with a germicidal ultra-violet lamp for 1 minute. The resulting hydrophilic surface resisted moderate abrasion and could not be removed by adhesive tape.

EXAMPLE 11

A 2 percent aqueous solution of photographic gelatin was coated as a thin film on a sheet of poly(ethylene terephthalate). After drying, the sheet was heated to 90°C and irradiated for 1 minute with a germicidal ultra-violet lamp. The resulting hydrophilic surface could not be removed by adhesive tape and resisted prolonged washing with warm water.

A further sheet was prepared in the same way and then coated with a gelatin based photographic silver halide emulsion. After suitable ageing this was exposed to light and processed normally. The results of sensitometic tests were identical with a parallel experiment using commercially subbed photographic film base.

EXAMPLE 12

An aqueous solution containing 1.5 percent of photographic grade gelatin and 2 percent poly(ethylacrylate) in the form of an aqueous emulsion was coated as a thin film onto 7 mils. thick unsubbed and unprimed poly(ethylene terephthalate) film base. After drying, the film was heated to about 100°C and irradiated with a bank of germicidal ultra-violet lamps for 1½ minutes. The film was then coated with a gelatin based photographic silver halide emulsion and after suitable ageing was exposed to light and processed normally.

The results of sensitometric tests were identical with a parallel experiment using commercially available subbed photographic film base. The wet adhesion of the emulsion coated material prepared in this Example was compared with that of the material of Example 11 in the following way. The emulsion was scraped off the sheet in 2mm wide bands 5mm apart and the strip then soaked in water. A probe consisting of an 0.014 inch diameter wire wound on in a circle round a cylinder of diameter 3/16 inch was then placed at one end of the sheet with the plane of the wire circle parallel to the bands. It was then dragged over the emulsion in a series of runs with a constant load for each run but increasing load between runs. The load required to strip 50 percent of the emulsion remaining between bands was taken as a measure of wet adhesion. A load of 20g was required to strip 50 percent of the emulsion in the case of the material prepared in this Example whereas a load of 12g was required to strip the emulsion for the material prepared in Example 11. Both these results are within the range obtained from coating the same emulsion on commercially subbed bases. These results show that the wet adhesion to polyester film surface modified with a heterogeneous system as described in this Example, is better than that manifested by the polyester film surface modified as described in Example 11.

EXAMPLE 13

A 2 percent aqueous solution of poly(ethyleneimine) was coated in a thin film onto a sheet of poly(ethylene terephthalate). After drying the sheet was heated to 120°C and irradiated with a germicidal ultra-violet lamp for 2 minutes. The resulting hydrophilic surface showed good abrasion resistance, could not be removed from the substrate with adhesive tape and could be dyed with acid dyes.

EXAMPLE 14

A 0.1 solution of a silicon polymer in petroleum ether was spread as a thin film on a sheet of poly(ethylene terephthalate). After evaporation of the solvent the sheet was heated to 130°C and half was irradiated with a germicidal ultra-violet lamp for 2 minutes. The sheet was then washed thoroughly with a pad soaked in petroleum ether whereupon the unirradiated area of the coating was immediately removed leaving the irradiated area with a modified surface. This surface showed very poor adhesion for adhesive tape and provides a useful back-size treatment for the back surface of such tapes.

EXAMPLE 15

An aqueous solution containing 0.75 percent sulphonated poly(vinyl toluene), 0.75 percent N,N'-methylenediacrylamide and a small amount of saponin was prepared. Polyester monofilament was drawn from a bobbin through this solution and then through a heated chamber maintained at about 100°C and containing a bank of germicidal ultra-violet lamps. Residence time in the chamber was about 15 seconds. The fibre, after treatment showed no reduction in physical strength and had a tough, strongly bonded hydrophilic coating which imparted useful antistatic properties and allowed the fibre to be dyed. Fibres treated in this way or with other compounds can be used to advantage in the production of composite materials such as automobile tyres or in bonded non-woven webs to which they impart greater strength than is obtainable by the use of unmodified fibres.

EXAMPLE 16

An aqueous solution containing 1.5 percent sulphonated poly(vinyl toluene) and a small amount of saponin was coated in a thin film on a sheet of nylon 66. After drying the sheet was heated to 120°C and irradiated with a germicidal ultra-violet lamp for two minutes. The resulting hydrophilic surface coating showed excellent adhesion to the base, imparted antistatic properties to the sheet and enabled it to be dyed with basic dyes.

EXAMPLE 17

An aqueous solution containing 1.5 percent sulphonated poly(vinyl toluene), 1.5 percent N,N'-methylenediacrylamide and a small amount of Teepol (Tradename for the sodium salt of a secondary alkyl sulfate available from Shell Company in which the two branches of the alkyl are unequal and total 8 to 18 carbon atoms) to assist in wetting was coated as a thin film on a thin sheet of a polyimide, trade name Kapton made by DuPont. After drying the film was heated to 120°C and irradiated for 1½ minutes with a germicidal ultra-violet lamp. The resultant hydrophilic coating was very hard and well attached to the substrate. The film now showed no tendency to hold a static charge and could be dyed with basic dyes.

EXAMPLE 18

An aqueous solution containing 0.6 percent sulphonated poly(vinyl toluene), 0.6 percent N,N'-methylenediacrylamide and 3 percent poly(ethyl acrylate) as an aqueous emulsion with added saponin was coated in a thin layer on a thin sheet of polyethylene. After drying the sheet was heated to 80°C and irradiated for 2 minutes with a germicidal ultra-violet lamp. The resulting well attached hydrophilic surface was easy to write on with water based inks, conferred antistatic properties to the film and enabled it to be dyed with basic dyes.

In a parallel experiment an aqueous solution containing 1.5 percent sulphonated poly(vinyl toluene), 1.5 percent N,N-methylenediacrylamide and a small amount of saponin was coated at the same coating weight on a thin sheet of polyethylene. After drying the sheet was heated to 80°C and irradiated for 2 minutes as before. When the sheet was tested by pulling it from beneath a pad consisting of a soft cloth of area 1 cm$^2$ moistened with water and loaded with a weight of 2.5 Kg., the coating was largely removed from the surface after three passes, whereas the sample prepared using poly(ethyl acrylate) in the coating mixture withstood ten such passes without removal of the coating. This demonstrates the advantage of using heterogeneous mixtures for surface modification of polyethylene to improve interfacial photobonding and thus ensure better resistance to surface abrasion.

EXAMPLE 19

An aqueous solution containing 0.6 percent sulphonated poly(vinyl toluene) and 3 percent poly(ethyl acrylate) as an aqueous latex with a small quantity of saponin was prepared. A hexagonal nut made of rigid poly(vinyl chloride) was dipped in this solution and then dried. It was then hung in a heated enclosure at 90°C and irradiated for 1½ minutes by germicidal ultra-violet lamps which surround it. After this treatment the whole surface of the nut was covered by a well bonded hydrophilic coating. This demonstrates the use of the invention to modify uniformly the surface of an article having a complex shape.

EXAMPLE 20

An aqueous solution containing 1.5 percent sulphonated poly(vinyl toluene) and 1.5 percent N,N'-methylenediacrylamide with a small quantity of Teepol to assist in wetting was coated in a thin layer on a sheet of polycarbonate. After drying the sheet was heated to about 100°C and irradiated for 2 minutes with a germicidal ultra-violet lamp. The resulting hydrophilic surface was scratch resistant, could not be removed by adhesive tape and could be dyed with basic dyes.

EXAMPLE 21

An aqueous solution containing 1.5 percent of sulphonated poly(vinyl toluene), 0.04 percent of saponin, and 5 percent of poly(ethyl acrylate) as an aqueous emulsion, was coated on a per sheet of degreased aluminum at a rate of 1 × 10$^{-4}$ g of solution pre cm$^2$ of the surface of the aluminum sheet. After drying, the coated surface of the aluminum sheet was covered with a stencil, heated to 140°C and irradiated for 2 minutes with a germicidal ultra-violet lamp. The sheet was then placed in water and rubbed to remove the coating from the unexposed area. The coating in the exposed areas remained firmly attached to the surface of the aluminum sheet, was hydrophilic and so could be dyed image-wise in a pattern corresponding to that of the stencil with a basic dye.

In another experiment an aqueous solution containing 1.5 percent sulphonated poly(vinyl toluene), 1.5 percent N,N-methylenediacrylamide and 0.04 percent of saponin was coated on a similar sheet of aluminum at the same coating weight and irradiated under the same conditions. When both sheets were tested as described in Example 18 the coating on this sheet was largely removed after two passes whereas the sheet coated with a mixture containing poly(ethyl acrylate) withstood ten such passes with no sign of removal of the coating. This demonstrates the advantage of using a heterogeneous mixture of compatible materials for surface modification of aluminum to improve interfacial photobonding and thereby ensure better resistance to surface abrasion.

EXAMPLE 22

An aqueous solution containing 0.55 percent of sulphonated poly(vinyl toluene), 0.55 percent, N,N-methylenediacrylamide and 0.05 percent Teepol was coated at a thickness of 6 × 10$^{-4}$ g of solution per cm$^2$ on the matte side of a commercial drafting film consisting of a polyester film with silica firmly bonded to one side. After drying the film was heated to about 100°C and irradiated with a bank of germicidal ultra violet lamps for 30 seconds. The film was then subjected to a number of cycles as follows. It was first written on with drafting ink and then when the ink was dry, sticky tape was firmly stuck over the writing and smartly ripped off. No ink was removed. The writing was then erased with a soft rubber moistened with water. The treated material withstood four such cycles in the same area before failure occured as determined by removal of some of the ink by the tape. A piece of untreated material failed in the first cycle since most of the ink was removed by the tape the first time it was removed from the film.

EXAMPLE 23

An aqueous solution containing 1.5 percent of a water soluble urea formaldehyde condensate partially etherified with methanol was prepared as described on page 459 of the book "Preparative Methods of Polymer Chemistry" 2nd Edition by Sorenson and Campbell. 0.25 percent of Teepol was also added to the solution and it was coated at a thickness of 4 × 10$^{-4}$ g of solution per cm$^2$ on the matte side of commercial drafting film. After drying the film was heated to about 100°C and irradiated with a bank of germicidal ultra violet lamps for 30 seconds. The film was then subjected to a number of writing, taping and erasing cycles as described in Example 22. This material withstood seven such cycles in the same area before failure occured whereas untreated material failed in the first cycle.

These Examples illustrate the wide utility of the invention. Also they demonstrate ways in which strength of adhesion of the surface modifying coating can be varied to suit particular purposes. Thus a very strongly adherent coating can be achieved for use in drafting film as described in Examples 22 and 23.

We claim:

1. A process for modifying the surface properties of a substrate by bonding to said substrate a coating of a mixture of two modifying materials in an amount giving no more than negligible increase in weight and a final thickness of no more than about 0.1 $\mu$ comprising
   A. coating said substrate with said mixture in which one modifying material is selected to provide finally desired surface properties and the other is selected to be readily bondable to said substrate under the influence of ultra-violet light and is present as an emulsion in a solution of the first said modifying material, drying said coating and
   B. irradiating through said coating at a temperature of 60° to 180°C to the interface with said substrate with ultra-violet light of wavelength about 180 to 400 nm. for a time sufficient to give effective bonding of modifying material to said substrate without substantial degradation of the molecules of modifying materials or substrate.

2. A process as claimed in claim 1 in which the substrate is a polyester, a polyamide, a polyimide, a polymeric olefin, a modified cellulose or a metal.

3. A process as claimed in claim 1 in which the modifying material which provides is a member of the group consisting of a poly(ethylene oxide), poly(propylene oxide), sulphonated polystyrene, sulphonated poly(vinyl toluene), p-(n-dodecyl)benzene sulphonic acid, n-dodecyl dimethylamine, gelatin, modified cellulose, poly(vinyl pyrrolidone), poly(vinyl pyridine), maleic anhydride copolymer, poly-$\beta$-perfluoroctyl sulphonamide, polymer or copolymer of acrylic acids, acrylic acid amides, acrylic acid esters, polyvinyl alcohol, partially hydrolysed poly(vinyl acetate), polyethyleneimine, hydrocarbon polymer, fluorocarbon polymer, hydrocarbon and fluorocarbon copolymer including block copolymer, a silicone polymer, water soluble urea formaldehyde condensate and compatible mixture of two or more of these compounds;

4. The process according to claim 1 wherein at least one modifying material absorbs ultra-violet light.

5. A process for the preparation of subbed hydrophilic photographic polyester film base wherein polyester film base is modified, with negligible increase in weight and to a thickness of less than 0.1$\mu$, by first coating with a mixture of an aqueous emulsion of sulfonated polystyrene in a gelatine solution, drying and thereafter irradiating with ultra-violet light of a wavelength of 180 to 400 nm. for a time sufficient to give effective bonding of said sulfonated polystyrene and gelatine without substantial degradation thereof or of said polymer film base.

6. A subbed hydrophilic photographic film base comprising a polyester film base and effectively bonded to at least one surface a hydrophilic layer no more than 0.1$\mu$ thick imparting negligible increase in weight to said polyester film base said layer consisting essentially of sulphonated polystyrene and gelatine.

* * * * *

UNITED STATES PATENT AND TRADEMARK OFFICE
CERTIFICATE OF CORRECTION

PATENT NO. : 3,892,575
DATED : July 1, 1975
INVENTOR(S) : Ronald E. Watts and Louis A. Errede It is certified that error appears in the above-identified patent and that said Letters Patent are hereby corrected as shown below:

Cover page, [75], "both of Harlow, England" should read -- Harlow, England and North Oaks, Minnesota -- .

Column 7, line 39, "2." should read -- a. -- .

Column 9, lines 23-24, "sensitometic" should read -- sensitometric -- .

Column 10, line 9, "0.1" should read -- 0.1% -- .

Column 11, line 62, "per" should read -- thin -- .

Column 11, line 63, "pre" should read -- per -- .

Signed and Sealed this

Sixth Day of July 1976

[SEAL]

Attest:

RUTH C. MASON
*Attesting Officer*

C. MARSHALL DANN
*Commissioner of Patents and Trademarks*